(12) United States Patent
Vanigli

(10) Patent No.: US 10,829,314 B2
(45) Date of Patent: Nov. 10, 2020

(54) ANGLE-NORMALIZING GEARMOTOR LIFE EXTENSION FOR HIGH SPEED DIVERTER SYSTEM

(71) Applicant: Siemens Logistics LLC, DFW Airport, TX (US)

(72) Inventor: Angelo Vanigli, Frisco, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 0 days.

(21) Appl. No.: 16/585,003

(22) Filed: Sep. 27, 2019

(65) Prior Publication Data

US 2020/0102157 A1 Apr. 2, 2020

Related U.S. Application Data

(60) Provisional application No. 62/737,990, filed on Sep. 28, 2018.

(51) Int. Cl.
*B65G 47/82* (2006.01)
*B65G 47/74* (2006.01)
*B65G 47/76* (2006.01)
*G05B 19/4155* (2006.01)

(52) U.S. Cl.
CPC ....... B65G 47/766 (2013.01); G05B 19/4155 (2013.01); *B65G 2201/0223* (2013.01); *B65G 2203/0283* (2013.01); *B65G 2811/0657* (2013.01); *G05B 2219/34013* (2013.01)

(58) Field of Classification Search
CPC ...... B65G 47/74; B65G 47/82; B65G 47/766; G05B 19/4155

USPC ..... 198/367, 370.01, 370.02, 370.03, 370.07
See application file for complete search history.

(56) References Cited

U.S. PATENT DOCUMENTS

| | | | | |
|---|---|---|---|---|
| 5,010,998 A | * | 4/1991 | MacMillan | B65G 47/766 198/367 |
| 5,452,786 A | * | 9/1995 | Gilmore | B65G 47/766 198/367 |
| 5,988,356 A | * | 11/1999 | Bonnet | B65G 47/766 198/369.5 |
| 6,220,421 B1 | * | 4/2001 | Hugon | B65G 47/82 198/370.07 |
| 7,124,876 B2 | | 10/2006 | Wolf | |
| 7,506,745 B1 | * | 3/2009 | McGuire | B65G 15/14 198/370.1 |
| 7,637,366 B2 | | 12/2009 | Roll et al. | |
| 7,819,233 B2 | * | 10/2010 | Van Schaijk | B65G 47/766 198/370.07 |
| 8,312,980 B2 | * | 11/2012 | Wilson | B65G 47/82 198/370.07 |
| 8,534,451 B2 | * | 9/2013 | Damen | B65G 47/682 198/347.4 |
| 8,616,361 B1 | * | 12/2013 | Shankarbabu | B65G 47/766 198/370.07 |
| 9,745,205 B1 | * | 8/2017 | Yao | H01M 4/5815 |

* cited by examiner

*Primary Examiner* — Douglas A Hess

(57) ABSTRACT

A diverter system includes a diverter arm and an actuator assembly for operating and moving the diverter arm, wherein the diverter arm and the actuator assembly are configured such that the diverter arm is moveable between a retracted dwell position and a plurality of extended dwell positions within an impact dwell range.

14 Claims, 2 Drawing Sheets

ANGLE-NORMALIZING GEARMOTOR LIFE EXTENSION FOR HIGH SPEED DIVERTER SYSTEM

CROSS REFERENCE TO RELATED APPLICATIONS

This application claims benefit of U.S. provisional application No. 62/737,990 filed 28 Sep. 2019 in the United States Patent and Trademark Office, the content of which is herein incorporated by reference in its entirety.

BACKGROUND

1. Field

Aspects of the present disclosure generally relate to a diverter system and a method for operating a diverter system. Such a diverter system is particularly suitable for use in baggage handling and parcel sortation systems.

2. Description of the Related Art

Diverter systems, including high speed diverter systems, typically comprise one or more paddles, herein also referred to as diverting arms, that are pivotally mounted for example adjacent a conveyor. The paddles or diverting arms are operated by an actuator, such as a motor, either directly or through linkages, to move between a home position, also referred to as retracted position, typically adjacent the conveyor, to a diverting position, also referred to as extended position. The paddles move across the conveying surface to divert objects being conveyed on the conveying surface in a diverting direction to a different conveyor, cute, bin etc.

The different positions of a paddle or diverting arm are controlled for example via dwell positions utilizing mechanical components; hence, these diverter systems tend to generate a great deal of wear and tear on the components of the paddles or arms due to impacts created by the objects being conveyed and diverted. For example, when the paddles are in the diverting position, every time an object, such as a bag or other articles, hits the paddles, energy of an impact is transmitted to the paddles. Because the extended position of the paddle is fixed, areas of mechanical components affected by the repetitive impact are always the same and in a long term may break, causing failure of the diverter system. Thus, an improved diverter system may be desired.

SUMMARY

A first aspect of the present disclosure provides a diverter system comprising a diverter arm, an actuator assembly for operating and moving the diverter arm, wherein the diverter arm and the actuator assembly are configured such that the diverter arm is moveable between a retracted dwell position and a plurality of extended dwell positions within an impact dwell range.

A second aspect of the present disclosure provides a method for operating a diverter system comprising toggling between a retracted dwell position and a plurality of extended dwell positions of a diverter arm, wherein the diverter arm is in an extended dwell position for a predefined period and diverts articles during the predefined period.

DETAILED DESCRIPTION

To facilitate an understanding of embodiments, principles, and features of the present disclosure, they are explained hereinafter with reference to implementation in illustrative embodiments. In particular, they are described in the context of being a diverter system and a method for operating a diverter system. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
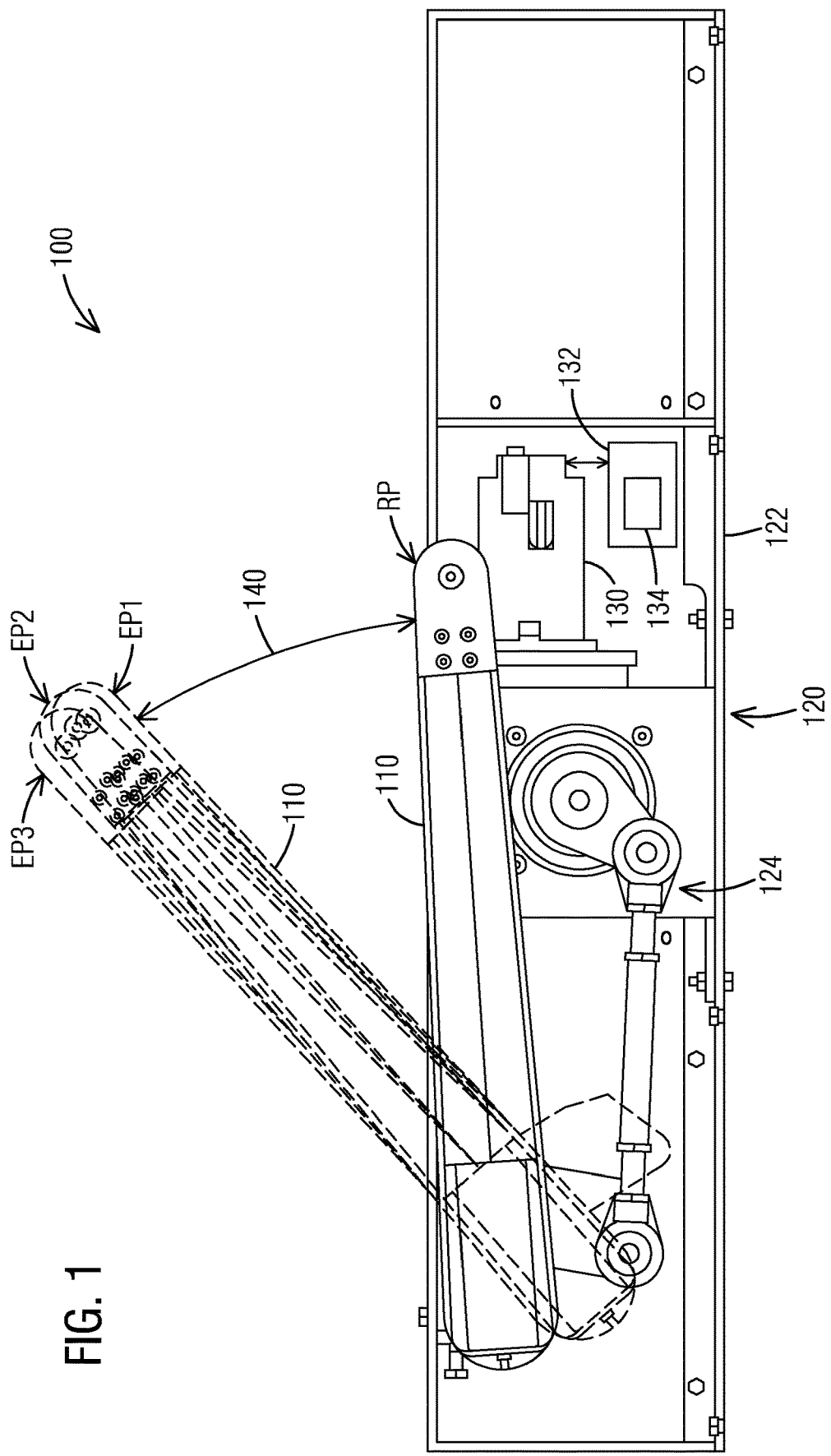
FIG. 1 illustrates a plan view of a diverter system in accordance with an exemplary embodiment of the present disclosure.

FIG. 1 illustrates a plan view of a diverter system 100 in accordance with an exemplary embodiment of the present disclosure. The diverter system 100 comprises a diverter arm 110 (also known as a paddle) and an actuator assembly 120 for operating and moving the diverter arm 110. The diverter arm 110 and the actuator assembly 120 are configured such that the diverter arm 110 is moveable between a retracted dwell position RP (also known as home position) and a plurality of extended dwell positions EP1, EP2, EP3 (also known as diverting positions) within an impact dwell range. Movement of the diverting arm 110 is illustrated by path 140.

The diverter assembly 100 can be used within baggage handling systems, for example at airports, parcel handling systems within mail processing facilities, or many other handling systems including for example automated sortation systems etc. In an embodiment, the diverter system 100 is configured as high-speed diverter system.

The diverter system 100 of FIG. 1 illustrates one diverter arm 110, but it should be noted that the diverter system 100 can comprise multiple diverter arms 110, located at different positions within the diverter system 100.

In an embodiment, the actuator assembly 120, which operates the diverting arm 110, is housed in enclosure 122 and comprises a gearmotor 130 and a drive 132. The drive 132 is only illustrated schematically and may be integrated in the gearmotor 130 or may be a separate component. The gearmotor 130 is operably coupled to the diverter arm 110, and the drive 132 is configured to power and control the gearmotor 130. The gearmotor 130 comprises a plurality of stages, wherein an output stage functions as a shaft for turning or moving the diverting arm 110 from position RP to an extended dwell position EP 1, EP 2 or EP 3 (see further details in FIG. 2).

When the diverting arm 110 is in an extended dwell position, every time a bag or parcel hits the diverting arm 110, energy of an impact is transmitted to the gearmotor 130, at gear mesh points. Since the one extended dwell position of the arm 110 is fixed, the repetitive impact of the bags or parcels to the gear mesh points is always the same, e.g. the stages are always affected at a same position, which in a long term may break and thus may cause failure of the gearbox.

Thus, in accordance with an exemplary embodiment of the present disclosure, the diverting arm 110 is moveable between multiple extended dwell positions EP 1, EP 2 and EP 3 within an (defined) impact dwell range. This means that the diverting arm 110 is positioned or fixed at different extended dwell positions over different periods. Thus, an accumulated impact and wear of the gearmotor 130 are distributed across a broader dwell within the gearmotor 130.

The diverter arm 110 is pivotally mounted for example adjacent a conveyor or other transporting means, such as a transporting belt. For diverting articles or objects, the diverter arm 110 is moved from the retracted dwell position RP to an extended dwell position EP1, EP2 or EP3, wherein the arm 110 moves across a surface of the conveyor or transporting means to divert objects or articles travelling on the surface in a diverting direction. For example, the diverting arm 110 is moved along path 140 up to a specific angle between RP and EP 1 (or EP 2 or EP 3), for example an angle of about between 40° and 50°. In an example, the diverting arm 110 can be moved from retracted dwell position RP to first extended dwell position EP 1 at an angle of about 43° or to second extended dwell position EP 2 at an angle of about 45° or to a third extended dwell position EP 3 at an angle of about 47°. When in an extended dwell position EP 1, EP 2 or EP 3, the diverting arm 110 forms a vertical powered wall for a transfer of items or articles from a main sortation line to a pier chute or takeaway conveyor. The provided angles between the retracted dwell position RP and the varied extended dwell positions EP 1, EP 2 and EP 3 are exemplary, and may comprise different values, depending on how far the diverting arm 110 should be moved for diverting purposes of a specific application.

In an embodiment, the diverter arm 110 is in one of the extended dwell positions EP 1, EP 2 or EP 3 for a predefined period and diverts or transfers articles during the predefined period. For example, when in operation, the diverter arm 110 may be in the first extended dwell position EP 1 for a period of 24 h and during these 24 h, articles, such as bags or parcels, or diverted via the diverting arm 110. In order to reduce wear and stress of the gearmotor 130 at this specific position EP 1, after completion of the period of 24 h, the diverting arm 110 is moved to the second extended dwell position EP 2 for a predefined period, which can be seconds, minutes, hours or several days, depending for example on utilization of the diverter system 110. After completion of the period of the second position EP 2, the diverting arm 110 can be moved to the third extended dwell position EP 3 for a predefined period. Then, the diverting arm 110 may be moved to the first extended dwell position EP 1 again. Thus, the impact and wear of the gearmotor 130 is distributed over the multiple extended dwell positions EP 1, EP 2, EP 3. Of course, it should be noted that the diverting arm 110 may be moveable to more than three extended dwell positions, for example five or six different extended positions.

In an embodiment, the gearmotor 130 comprises a servo motor, and the drive 132 comprises a variable frequency drive (VFD), for example a servo drive, operably coupled to the servo motor and powering and controlling the servo motor. The drive 132 can be integrated in the gearmotor 130 and generally provides speed adjustments, for example for belts or other means that operate or move the diverting arm 110.

In an embodiment, the actuator assembly 120, specifically the drive 132, comprises a control unit 134 storing computer executable instructions, executable by at least one processor, for example to adjust speeds of the gearmotor 130 and thereby moving the stages (gears) of the gearmotor 130 and moving the diverting arm 110. For example, the control unit 134 stores computer executable instructions to automatically toggle between the plurality of extended dwell positions EP 1, EP 2 and EP 3. This means that the diverter system 100, specifically the actuator assembly 120, is programmed to automatically toggle or switch or alternate between the different extended dwell positions EP 1, EP 2 and EP 3. In addition, the diverter system 110 can be configured such that the diverting arm 110 can be manually moved, for example by an operator, to the different extended dwell positions EP 1, EP 2, EP 3.

Those of skill in the art will recognize that not all details are shown or described in the system 100 of FIG. 1. For example, the housing or enclosure 122 may house other components of the diverter system 100, such as arm or paddle belts and/or other mechanical or electromechanical components 124.

Figure 2:
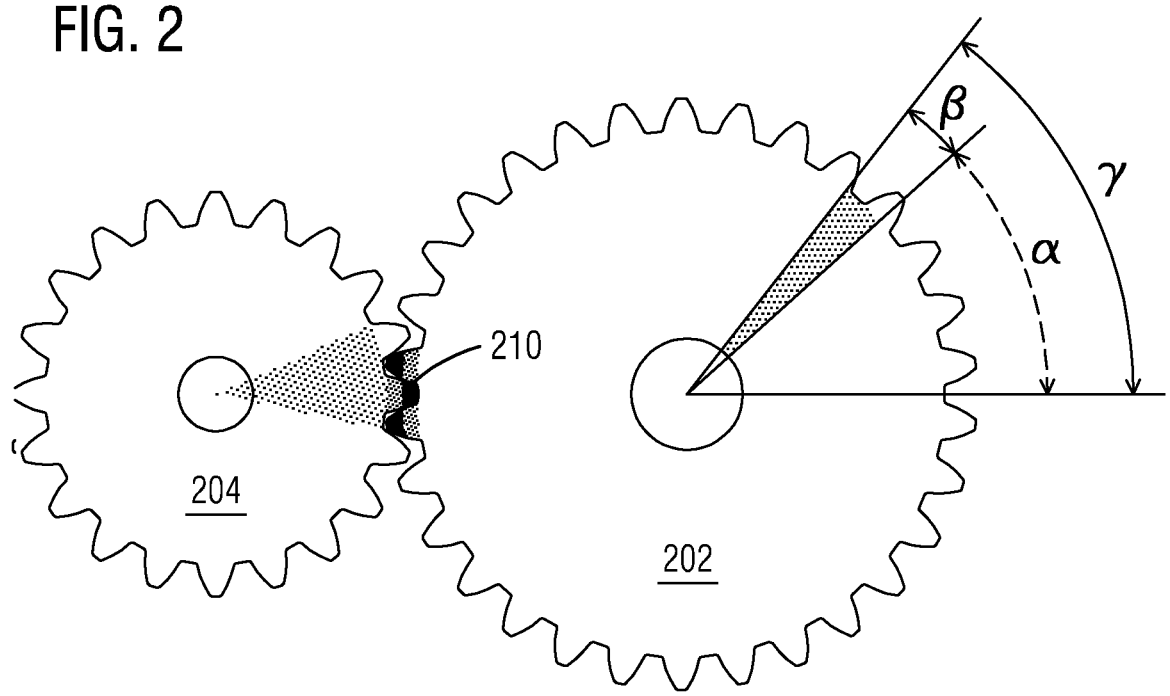
FIG. 2 illustrates a schematic view of a section of a diverter system in accordance with an exemplary embodiment of the present disclosure.

FIG. 2 illustrates a schematic view of a section of a diverter system 100 in accordance with an exemplary embodiment of the present disclosure. Specifically, FIG. 2 illustrates a single reduction stage of the gearmotor 130 for operating the diverting arm 110.

Gearmotor 130 or a gearbox comprises a plurality of reduction stages, established by multiple geared couplings of various sizes of gear with particular tooth designs. In one example, a first gear 202 interacts with a second gear 204, wherein the second gear 204 operates as a shaft for turning or moving the diverting arm 110 from position RP to an extended dwell position EP 1, EP 2 or EP 3 (see FIG. 1). When in one of the extended dwell positions, the gearmotor 130 holds the diverting arm 110 at an extended dwell angle and prevents the diverting arm 110 from moving.

When the gears 202, 204 are in a fixed position, concentration of stress and wear occur in a same area of the gears 202, 204. This area of stress and wear is labelled with reference numeral 210. As can be seen, the stress and wear occur over a few teeth of the first and second gears 202, 204. In order to reduce and relocate or distribute the stress and wear of the few teeth, the gears 202, 204 are turned over an increased range of extended dwell positions EP 1, Ep 2, Ep 3. The total range of actuations is labelled γ, wherein range (angle) γ is a sum of an original actuation range (angle) a and an impact dwell range β. The impact dwell range β describes or defines an addition or extension of the original range α based on added extended positions (such as EP 2 and EP 3) of the diverting arm 110. Thus, the first gear 202 and second gear 204 are rotated over a greater range which distributes the stress and wear to different teeth of the gears 202, 204. For example, divert angle α may correspond to the first extended position EP 1 and the divert angle γ may correspond to the third extended position EP 3. A divert angle of the second extended position EP 2 may be between angles α and γ.

Figure 3:
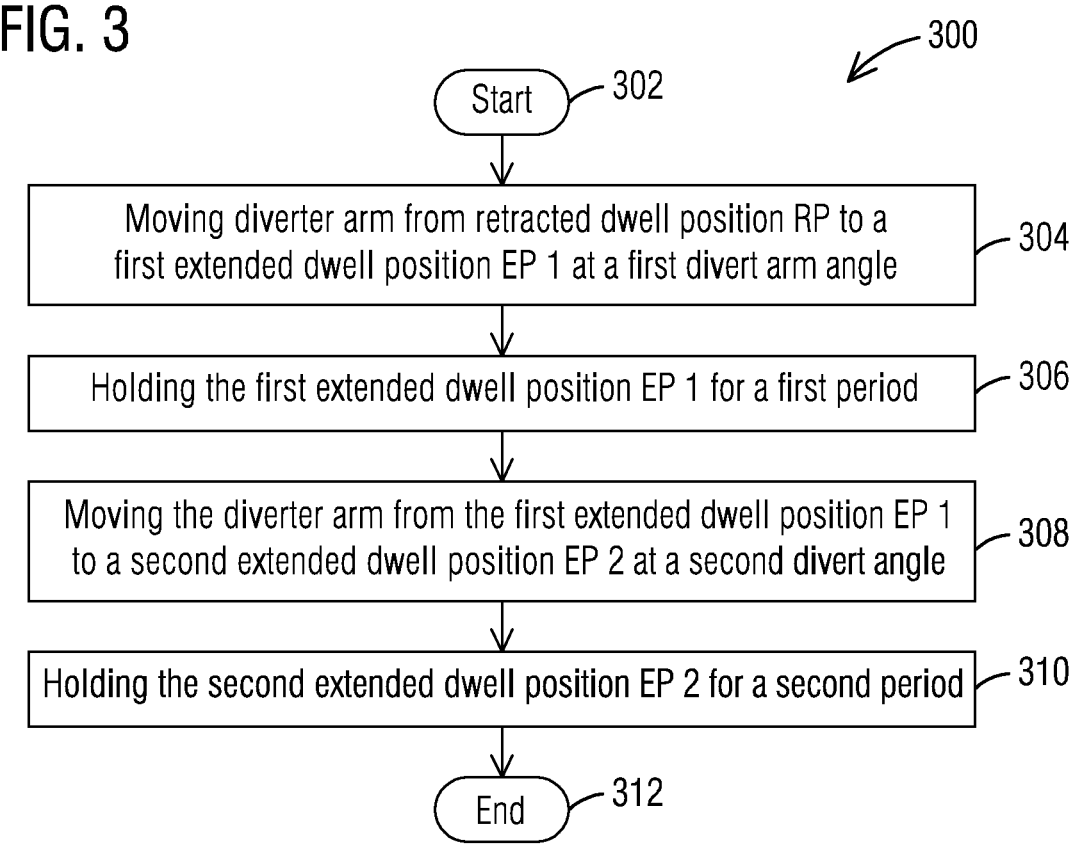
FIG. 3 illustrates a flow chart of a method for operating a diverter system in accordance with an exemplary embodiment of the present disclosure.

FIG. 3 illustrates a flow chart of a method 300 for operating a diverter system in accordance with an exemplary embodiment of the present disclosure. While the method 300 is described as a series of acts that are performed in a sequence, it is to be understood that the method 300 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

In an embodiment, the method 300 comprises toggling between a retracted dwell position RP and a plurality of extended dwell positions EP 1, EP 2 and EP 3 of a diverter arm 110 of a diverter system 100, for example as described with reference to FIG. 1, wherein the diverter arm 110 is in an extended dwell position EP 1, EP 2 and EP 3 for a predefined period and diverts articles during the predefined period.

In an exemplary embodiment, the method may start at 302 and may comprise an act or process 304 of moving the diverter arm 110 from the retracted dwell position RP to a first extended dwell position EP 1 at a first divert arm angle and act 306 of holding the first extended dwell position EP 1 for a first period. During the first period, the diverter system 100 with arm 110 is in operation and the arm 110 diverts objects or items, such as bags or parcels. The method 300 may further include an act 308 of moving the diverter arm 110 from the first extended dwell position EP 1 to a second extended dwell position EP 2 at a second divert angle and an act 310 of holding the second extended dwell position EP 2 for a second period. During the second period, which may be shorter or longer than the first period, the diverter system 100 with arm 110 is in operation and the arm 110 diverts objects or items, such as bags or parcels. At 312, the method may end.

Further acts of the method 300 may include moving the diverting arm 110 back to the retracted dwell position RP, for example when the diverter system 100 is no longer in operation, or in between extended dwell positions EP 1 and EP 2. The moving or operation of the diverter arm 110 is automated, for example via a gearmotor 130 including a gearmotor drive 132 that automatically controls the gearmotor 130. For example, the diverting 110 toggles or switches between different dwell positions RP, EP 1, EP 2, EP 3 automatically, facilitated via control software of the gearmotor drive 132.

With the described system 100 and method 300 a serviceable life of the gearmotor 130 of the diverter system 100 is extended, because the accumulated impact and wear are distributed across a broader range of extended dwell of the gears 202, 204 of the gearmotor 130. Thus, the diverter system 100 is more reliable and requires less maintenance.

The invention claimed is:

1. A paddle diverter system comprising:
a diverter arm pivotally mounted at a first end, wherein an opposite second end of the diverter arm operates freely without being mounted,
an actuator assembly for operating and moving the diverter arm at the first end, wherein the actuator assembly comprises a gearmotor and a drive, the gearmotor being configured to move the diverter arm and the drive being configured to power and control the gearmotor,
wherein the diverter arm and the actuator assembly are configured such that the diverter arm is moveable between a retracted dwell position and a plurality of extended dwell positions within an impact dwell range,
wherein the gearmotor comprises a plurality of stages established by multiple geared couplings including a first gear interacting with a second gear, wherein the second gear operates as a shaft for moving the diverter arm from the retracted dwell position to the plurality of extended dwell positions, and
wherein the impact dwell range defines a range of divert arm angles, wherein each extended dwell position comprises a divert arm angle that falls in the range of divert arm angles.

2. The paddle diverter system of claim 1, wherein the diverter arm is in an extended dwell position for a predefined period and diverts articles during the predefined period.

3. The paddle diverter system of claim 1, wherein the actuator assembly is configured to move the diverter arm between the retracted dwell position and the plurality of extended dwell positions in an automated manner.

4. The paddle diverter system of claim 1, wherein the plurality of extended dwell positions comprises a first extended dwell position and a second extended dwell position, each extended dwell position comprising a divert arm angle, wherein the second extended dwell position comprises a greater divert arm angle than the first extended dwell position.

5. The paddle diverter system of claim 1, wherein the divert arm angle describes an angle between the retracted dwell position and the respective extended dwell position.

6. The paddle diverter system of claim 1, wherein the gearmotor comprises a servomotor, and the drive comprises a servo drive operably coupled to the servomotor and powering and controlling the servomotor.

7. The paddle diverter system of claim 1, wherein the actuator assembly comprises a control unit storing computer executable instructions executable by at least one processor to automatically toggle between the plurality of extended dwell positions.

8. The paddle diverter system of claim 1, configured as high speed diverter system.

9. A method for operating a paddle diverter system comprising:
toggling between a retracted dwell position and a plurality of extended dwell positions of a diverter arm, wherein the diverter arm is in an extended dwell position for a predefined period and diverts articles during the predefined period,
wherein the diverter arm is operated by an actuator assembly comprising a gearmotor and a drive, the drive being configured to power and control the gearmotor,
wherein a first gear drives a plurality of stages of the gearmotor, an output stage moving the diverter arm from the retracted dwell position to the plurality of extended dwell positions, and
wherein the plurality of extended dwell positions comprises a plurality of divert arm angles within an impact dwell range of the diverter arm.

10. The method of claim 9, further comprising:
moving the diverter arm from the retracted dwell position to a first extended dwell position at a first divert arm angle,
holding the first extended dwell position for a first period,
moving the diverter arm from the first extended dwell position to a second extended dwell position at a second divert angle,
holding the second extended dwell position for a second period.

11. The method of claim 10, wherein the diverter arm diverts articles during the first and second periods.

12. The method of claim 9, wherein the diverter arm is toggled automatically between the plurality of extended dwell positions.

13. The method of claim 9, wherein each extended dwell position comprises a divert arm angle that falls in the impact dwell range of divert arm angles.

14. The method of claim 9, wherein the paddle diverter system is configured as high speed diverter system.

* * * * *